US012800340B2

(12) United States Patent
Edstrom et al.

(10) Patent No.: US 12,800,340 B2
(45) Date of Patent: Nov. 17, 2026

(54) SYSTEM AND METHOD OF DATA MODELING, ESTIMATION, AND SELECTIVE CORRECTION FOR AGRICULTURAL MAPS

(71) Applicant: Deere & Company, Moline, IL (US)

(72) Inventors: Eric Edstrom, Des Moines, IA (US); Noel W. Anderson, Fargo, ND (US)

(73) Assignee: Deere & Company, Moline, IL (US)

( * ) Notice: Subject to any disclaimer, the term of this patent is extended or adjusted under 35 U.S.C. 154(b) by 401 days.

(21) Appl. No.: 18/160,106

(22) Filed: Jan. 26, 2023

(65) Prior Publication Data

US 2024/0255306 A1 Aug. 1, 2024

(51) Int. Cl.
*G01C 21/00* (2006.01)

(52) U.S. Cl.
CPC ..... *G01C 21/3837* (2020.08); *G01C 21/3856* (2020.08)

(58) Field of Classification Search
CPC ............ G01C 21/3837; G01C 21/3856; G01C 21/3804
USPC ........................................................ 701/532
See application file for complete search history.

(56) References Cited

U.S. PATENT DOCUMENTS 10,319,050 B2 6/2019 Richt
11,079,725 B2 8/2021 Palla et al.
2017/0168157 A1* 6/2017 Hagerman ................ G01S 7/40
2017/0168498 A1* 6/2017 Nakajima .......... G01C 21/3837
2018/0146624 A1* 5/2018 Chen .................. G05B 13/0265
2020/0337232 A1 10/2020 Blank et al.
2022/0026865 A1* 1/2022 Ersavas .................. A01G 25/16
2022/0286305 A1* 9/2022 Tan ......................... G06F 21/64
2024/0345586 A1* 10/2024 Kinnaman ............ G05D 1/226

FOREIGN PATENT DOCUMENTS

CN 114719838 B * 7/2024 .......... H04L 9/3297

* cited by examiner

*Primary Examiner* — Fadey S. Jabr
*Assistant Examiner* — Paula L Schneider
(74) *Attorney, Agent, or Firm* — Gary L. Montle; Lucian Wayne Beavers; Patterson Intellectual Property Law, PC

(57) ABSTRACT

A system and method are provided for generating maps based on map types further associated with various data entry fields needed to populate the respective map. A first set of data entry fields are populated for which underlying information is available from at least one data source, and a second set is identified of any data entry fields for which at least some underlying information is missing after the first set is populated. The method further includes selecting estimated information to populate the second set of data entry fields, generating the map including the underlying information and the estimated information in the corresponding data entry fields, and displaying the map on a user interface, wherein the displayed map includes an error estimate indication corresponding to at least one of the second set of data entry fields on at least a portion thereof.

12 Claims, 4 Drawing Sheets

SYSTEM AND METHOD OF DATA MODELING, ESTIMATION, AND SELECTIVE CORRECTION FOR AGRICULTURAL MAPS

FIELD OF THE DISCLOSURE

The present disclosure relates generally to the generation of maps, such as for example may be applied to various agricultural map types. More particularly, certain embodiments according to the present disclosure relate to displaying a map which includes values derived from estimated information by identifying the portions of the map using estimated information and, for example, prompting a user to supply the information.

BACKGROUND

Agricultural maps are often used for decision support, for example, in planning locations or quantities of certain crops to plant in a particular field. Such maps should optimally be easily understood by the end user, but accuracy and detail are also important objectives. A farm may for example have numerous fields, each of which includes numerous parameters which are relevant to planning, forecasting, reporting, and the like. The absence of accurate or at least sufficiently authenticated information for at least some such parameters may be anticipated, but conventional systems and methods lack techniques for automatically estimating or inferring data for such parameters in a manner that is sufficiently valuable to the user, and further identifying which of this data can or should be corrected to improve on the estimations and/or inferences.

In other fields of use, systems and methods may implement autofill techniques for empty data fields in online forms, but these are typically reliant on prior data entries from the same or presumed user thereof. In one example, tax preparation systems and methods may tag data fields having missing data, but will not automatically fill in or otherwise estimate or infer data for these fields, instead requiring a user prompt for each and every empty data field.

BRIEF SUMMARY

The current disclosure provides an enhancement to conventional systems, at least in part by introducing a novel system and method for generating and displaying a map which includes values derived from estimated information, indicating portions of the map which are using estimated information, and selectively prompting a user to supply information for at least some of the portions.

In one embodiment, a method as disclosed herein for generating a map includes selectively retrieving a map type for the map to be generated, the map type associated with a plurality of data entry fields needed to populate the map, and populating a first set of the plurality of data entry fields for which underlying information is available from at least one data source, and identifying a second set of any data entry fields for which at least some underlying information is missing after the first set of data entry fields is populated. The method in such an embodiment further includes selecting estimated information to populate the second set of data entry fields, generating the map including the underlying information and the estimated information in the corresponding data entry fields, and displaying the map on a user interface, wherein the displayed map includes an error estimate indication corresponding to at least one of the second set of data entry fields on at least a portion thereof.

In one exemplary aspect according to the above-referenced embodiment, the error estimate indication may comprise at least one of: a location on the map where estimated information was used to populate a corresponding data entry field; an estimated error determined from using the estimated information; a number of parameters that were estimated to generate a map value for at least one of the data entry fields; and a data authenticity value.

In another exemplary aspect according to the above-referenced embodiment, a user prompt may be generated to supply missing information for which estimated information was previously selected, the map may be regenerated including user-provided information in place of at least part of the estimated information, and the regenerated map may be displayed including any revised error estimate indications after the user-provided information has been applied.

In another exemplary aspect according to the above-referenced embodiment, the method may further include writing one or more of an initial map, the regenerated map, and the user-provided information to a computer-based immutable ledger.

In another exemplary aspect according to the above-referenced embodiment, at least part of the user-provided information is read accessible in association with the at least one data source for subsequent map generation.

In another exemplary aspect according to the above-referenced embodiment, the method may further include automatically inhibiting a further use of the map based on a failed confidence check with respect to at least one error estimate indication.

The inhibited further use may for example comprise control signals for controlling at least one actuator for a work machine.

In another exemplary aspect according to the above-referenced embodiment, the method may further include writing an inhibition status for the map to a computer-based immutable ledger.

In another exemplary aspect according to the above-referenced embodiment, the estimated information may be extracted in part from at least one model corresponding to the selectively retrieved map type.

In another exemplary aspect according to the above-referenced embodiment, the method may further include developing, for various map iterations over time, at least a first data set including estimated information for respective data entry fields and a second data set including at least one confidence check result for the respective map, wherein the estimated information for a subsequent map is extracted in part based on stored correlations between relevant data entry fields for the subsequent map type and a desired confidence check result.

In another exemplary aspect according to the above-referenced embodiment, the at least one data source having available underlying information may be or include data storage including georeferenced data from historical operations for a location corresponding to the map being generated.

In another embodiment, a system as disclosed herein comprises data storage having stored thereon one or more map types, each map type associated with a plurality of data entry fields needed to populate the map, at least a first user interface comprising a display unit, and at least one processor functionally linked to the data storage and to the user interface. The at least one processor in this embodiment is configured to direct the performance of steps in a method according to the above-referenced embodiment, and optionally any one or more of the exemplary aspects thereof.

Numerous objects, features and advantages of the embodiments set forth herein will be readily apparent to those skilled in the art upon reading of the following disclosure when taken in conjunction with the accompanying drawings.

DETAILED DESCRIPTION

Figure 1:
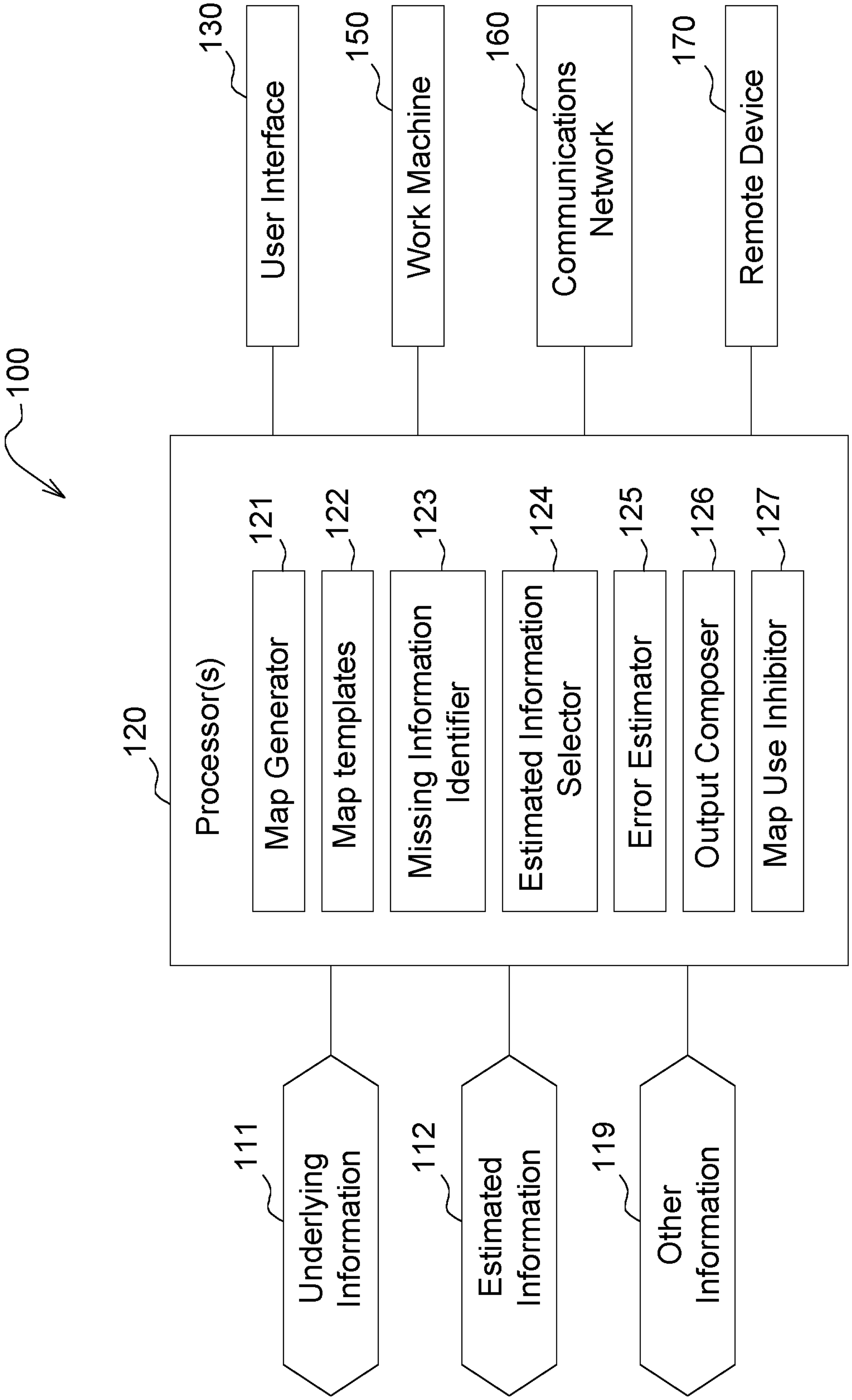
FIG. 1 is a block diagram representing an embodiment of a computer-implemented system of the present disclosure.

An embodiment of a system 100 as illustrated in FIG. 1 includes a computing unit 120 with data storage and one or more processors functionally linked, selectively or continuously, to various user interfaces 130, work machines 150, communications networks 160, other remote computing devices 170, and the like.

The provided examples are merely exemplary, as for example a work machine 150 may be linked to the computing unit 120 via communications network 160, user interface 130 may be generated to collect information from a remote device 170, and various other combinations as may readily be appreciated by one of skill in the art. In an embodiment as generally referenced herein but non-limiting in scope, the user interfaces 130 may be implemented by authorized users of a host system 100, and remote computing devices 170 may include third party or other external servers and/or data sources from which publicly available information such as weather data may be obtained.

A work machine 150 may in various embodiments only receive data from the host system 100, for example to receive maps which may be utilized for control of one or more actuators during a work cycle, but in other embodiments may also or in the alternative be configured to provide data to the host system 100, such as for example to provide real-time sensor outputs for generating a map associated with a location of the machine. Work machine sensors may include for example position sensors which generate outputs corresponding to a location, orientation, or pose of the work machine, sensors which generate outputs corresponding to different types of crop properties, such as crop type, crop moisture, characteristics of the crop as they are being processed, and the like. Exemplary work machines configured to controllably work terrain based at least in part on map outputs according to a system and method as disclosed herein may include without limitation tractors, harvesters, planting, seeding and tillage equipment, associated implements, and the like. Exemplary work machines may also include construction machines, turf care machines, or forestry machines.

Where multiple processors are implemented by the computing unit 120, one or more of the processors may be local, remote, or a mixture thereof. One or more of the processors may share information via wired, wireless, or a mixture of communications means. One or more processors may fixedly or dynamically assign portions of computation with respect to functions as described herein to one or more other processors of the computing unit.

One or more processors according to the computing unit 120 may carry out their tasks with varying degrees of human supervision or intervention. In various embodiments, humans may be located at any appropriate processor or communications node of the distributed system, and/or on a work machine or at some other location functionally linked to the computing unit 120 via user interfaces 130 or remote devices 170 such as for example screens, touch screens, wearable displays, audio or speech output such as ear buds or speakers, microphones, haptic output such as vibration or thermal devices, brain wave sensors, eye trackers, heart rate and other physiological sensors, or cameras for facial, gesture, or other body monitoring.

In some examples, processors of the computing unit 120 can include systems-on-a-chip, embedded processors, servers, desktop computers, tablet computers, or cell phones. In some examples, all or portions of computations may be performed by quantum computers.

The computing unit 120 may include or otherwise be configured to execute or selectively retrieve various software modules including but not limited to a map generator module 121, map templates 122, missing information identifier module 123, estimated information selection module 124, error estimator module 125, output composer module 126, map use inhibitor module 127, the respective functions for which may be further described below. It should be noted that the recited modules may be considered as exemplary and/or illustrative in nature, and may be executed in combination with other modules or even omitted entirely depending on the embodiment. While each of the above-referenced modules are illustrated in association with the computing unit 120 on FIG. 1, in various embodiments some or all of the modules may reside, entirely or in part, on a remote server or data storage and functionally linked to one or more processors of the computing unit 120 itself.

An embodiment of a method 200 as disclosed herein may for example be performed through implementation of the system 100 of FIG. 1. One of skill in the art may appreciate that alternative embodiments of the method 200 may include fewer or additional steps, and that certain disclosed steps may for example be performed in different chronological order or simultaneously. Generally stated, various operations, steps, or algorithms as described herein can be embodied directly in hardware, in a computer program product such as a software module executed by a processor, or in a combination of the two. The computer program product can reside in RAM memory, flash memory, ROM memory, EPROM memory, EEPROM memory, registers, hard disk, a removable disk, or any other form of computer-readable medium known in the art. An exemplary computer-readable medium can be coupled to the processor such that the processor can read information from, and write information to, the memory/storage medium. In the alternative, the medium can be integral to the processor, the processor and the medium can reside as discrete components in a user terminal, or the like.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps are described generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The components of a system 100 as disclosed herein, and more particularly a computing unit 120 and associated modules configured to execute steps in a method 200 as further described below, may generally be programmed to request, extract, receive, translate, ingest, and otherwise process data from user interfaces 130, work machines 150, remote devices 170 or the like via manual upload, application program interfaces, etc. Types and formats of such data may be well understood by those of skill in the art, and user interfaces 130 may for example be dynamically generated based on the type and/or format of data, a status of a user interacting with the computing unit 120 via the interface, a type of computing device associated with the user, etc.

Figure 2:
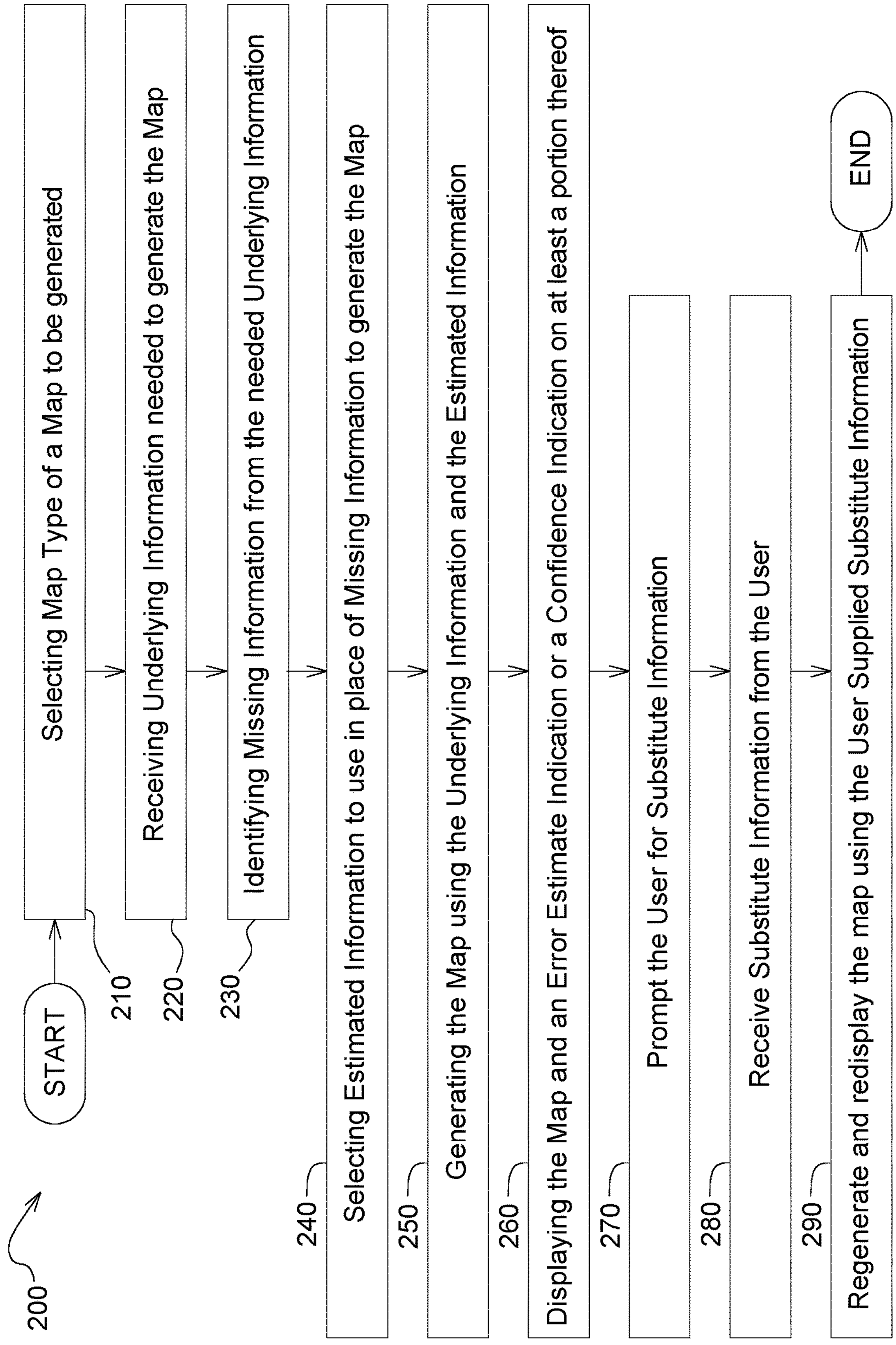
FIG. 2 is a flowchart representing an exemplary embodiment of a computer-implemented method of the present disclosure.

The method 200 as represented in FIG. 2 may begin (step 210) upon selection of a map type for a map to be generated, for example using map generator module 121. The selected map type may have a corresponding map template 122 in data storage, or in some embodiments a map template may be generated for the new map request based at least in part on user input associated with the selected map type. Selection of a map type may be based on user input and selection from among a plurality of available options, or may more dynamically be determined by the system based on user inputs defining a desired map and/or parameters thereof. For example, a user may provide one or more key words, a desired end use of the map, a location, etc., based upon which the system presents a type of map or a plurality of map types best corresponding to the desired map.

Depending for example on the map type and/or corresponding template, the method 200 may continue in step 220 by receiving, retrieving, or otherwise obtaining underlying information 111 as needed to generate or at least fully populate the map. As further described below, the underlying information 111 to be obtained may be determined at least in part from the map type and/or corresponding template, and in some embodiments underlying information 111 may at least in part be provided or otherwise identified by user input in association with the new map request. The underlying information 111 received by the host system 100 as part of step 220 may in certain embodiments include, or otherwise have determined by the host system, a data authenticity rating based for example on the use or level of encryption, a source reputation, the use of an immutable ledger, or the like.

The method 200 as represented in FIG. 2 continues in step 230 by identifying missing information from the underlying information as needed to generate or at least fully populate the map, for example using missing information identifier module 123. In embodiments where a map template 122 includes a specified number of required data entries, and for example one or more of the required data entries remain unfilled after step 220, the method 200 in step 230 may identify these one or more unfilled data entries and proceed in step 240 by selecting, identifying, or otherwise obtaining estimated information 112 to use in place of the missing information, for example using estimated information section module 124, and accordingly (step 250) generate the requested map in full and using the underlying information 111 and the estimated information 112.

As described in more detail with respect to illustrative examples below, estimated information may in various embodiments be inferred, predicted, or otherwise determined from other sources based on similarities in the respective data entry fields, persistent properties of the specified field or type of field, and the like. In some circumstances, changes in a corresponding data entry field from one time period to another may be reasonably expected to be small, wherein the entry from the previous time period for the same region may be utilized with an appropriate amount of identified uncertainty. In other circumstances, data may be readily available for an entire field but unavailable at the level of individual regions or management zones, in which case the full amount may be spread across the different subsets of the entire field, i.e., data entries may be applied for each region or zone which aggregate to the known amount but tagged to recognize some level of uncertainty. In still other circumstances, for example, data may be unavailable for the specific type of field at issue, but available for a particularly analogous type of field, wherein corresponding data entries may be applied but tagged to recognize some level of uncertainty. Management zones may comprise farms, sections, subsections, fields, sub-fields or any other suitable region of management.

In an embodiment, estimated information may be applied through the use of machine learning techniques, including but not limited to supervised learning techniques, for developing and teaching models implemented by the host system for the purpose of estimating information in one or more of the types of maps. Teaching such a model may for example include developing, for various map iterations over time, at least a first data set including estimated information for respective data entry fields and a second data set including at least one confidence check result for the respective map, wherein the estimated information for a subsequent map is extracted in part based on stored correlations between relevant data entry fields for the subsequent map type and a desired confidence check result. The confidence check results in various embodiments may be provided through feedback from any of a number of feedback channels, including the user interfaces, work machines, remote devices, and the like.

The initially completed map may in step 260 be generated on a display unit, for example based on output signals generated from output composer module 126. The display unit may be associated with user interface 130, an onboard display unit on work machine 150, a display unit on remote device 170, or the like. The initially completed map may also indicate, for example using visual indicia associated with the map portions, an error estimate indication or equivalent on at least one portion of the map, with the error estimate indications for example resulting from confidence checks as determined via error estimator module 125. Examples of error estimate indications within the scope of the present disclosure may include a location on the map where estimated information was used, an estimated error introduced from using the estimated information, a number of parameters that were estimated to generate a corresponding map value, a data authenticity rating, etc. Confidence checks or corresponding error estimate indications are not limited to the above-referenced examples, and a map portion including an error estimate indication may still satisfy a confidence check depending on the use case.

In an embodiment, for example as implemented using the map use inhibitor module 127, the method 200 may include inhibiting one or more further uses of the map based on the error estimate indications or equivalents. In an embodiment, some further uses may be inhibited if a confidence check based on a specified metric (e.g., a confidence level, error range, or the like) or a data authenticity rating fail to satisfy specified and corresponding thresholds. While the initially completed map may be generated and displayed, for example, to a particular authorized user, the inhibited further uses of the map may include forwarding or display of the map to other users, use of the map for control of actuators for at least one work machine 150, submission of the associated map data for documenting environmental services or for documenting agricultural practices, etc.

The method 200 as represented in FIG. 2 continues in step 270 by messaging one or more users to prompt subsequent user input for substitute information, for example to replace or otherwise supplement any underlying information 111 and/or estimated information 112 used for generating the initially completed map. Substitute information may be provided directly as user input or may include at least some information 119 from third party sources to which the host system is directed by prompted user input. Such user input in various embodiments may be provided after the initially completed map is generated without proactive messaging by the host system, for example by enabling user input via a corresponding user interface tool. The substitute information received as part of step 270 may in certain embodiments include, or otherwise have determined by the host system, a data authenticity rating based for example on the use or level of encryption, a source reputation, the use of an immutable ledger, or the like.

Upon receiving any such substitute information in step 280, or at least substitute information that is sufficiently authenticated or at least relevant for replacing or otherwise supplementing estimated information used for initially generating the map, the method 200 may further include in step 290 regenerating and redisplaying the map using (or at least upon consideration of) the user-supplied substitute information along with any or all of the previously implemented underlying information and estimated information. The method 200 may further loop back to one or more of the preceding steps based on subsequent feedback, for example including further substitute information to improve on estimated information in the regenerated map, or for example to account for changes in one or more rules causing a corresponding change in one or more confidence checks associated with the map, etc.

In some embodiments, the method 200 in one or more of the above-referenced steps may include mitigating the unauthorized monitoring, altering, or substitution of data communications. Without limitation, example embodiments may partially or fully implement any or all of: authentication of nodes sending or receiving data, for example via Physically Unclonable Functions (PUFs); encryption of data sent between nodes; use of a distributed, immutable ledger of data updates (e.g. Blockchain); and the like. In an embodiment, some or all data received from outside the host system, such as the obtained underlying information and/or substitute information, may become part of an immutable ledger. In an embodiment, data updates associated with the conversion of obtained data into display data as part of the method 200 may become part of an immutable ledger. In an embodiment, the initially completed map, the regenerated map, an inhibition status associated with either type of map, and the like may likewise become part of an immutable ledger.

For illustrative purposes, various applications of the above-referenced method 200 or equivalents thereof within the scope of the present disclosure may now be described. The method 200 may for example be applied to various agricultural map types including, without limitation, nutrient prescriptions (N, P, K, micronutrients, etc.), pesticide prescriptions, tillage prescriptions, yield estimates, carbon footprint, carbon sequestration, seeding prescription, and the like.

One of skill in the art may accordingly appreciate, at least in view of the above-referenced applications and agricultural map types, that the underlying information may include georeferenced data from a prior field operation, for example as-applied nitrogen including form of nitrogen, crop, georeferenced rate, placement (e.g., in-furrow, foliar, 2×2 sideband, date, time, soil temperature, and the like). Other exemplary and non-limiting underlying information in accordance with the above-referenced applications may include a service bill from an agricultural service provider, or other manually entered information. In one example, the total amount of applied material may be divided across the area of the relevant field. In another example, the service bill may include a georeferenced as-applied map.

One of skill in the art may further appreciate, at least in view of the above-referenced applications and agricultural map types, that the selection or otherwise determination of estimated information (e.g., using estimated information selector module 124) may be implemented according to a desire for a "best" estimate, for example using rules or other predetermined selection hierarchy, a neural network or other machine learning selection module, a manual selection via user input and/or for example from among supplied options, models or simulations for plant growth, carbon sequestration, and the like. In addition, or alternatively, the selection or otherwise determination of estimated information may be implemented based on available estimated information sources which may be provided or otherwise specified for that purpose and including, without limitation, historical data for a particular field, historical farm practice data for a particular field or type of field, regional composite (e.g., county, "zone", etc.) practice, a university recommendation (e.g., state), a look-up table with possible interpolation therefrom, an estimate based on crop yield (if the field has previously been harvested) or yield target (assuming zero carry over, or N credit for soy), crop rotation information, and the like. Publicly available data sets may be obtained for this purpose as well and within the scope of the present disclosure, for example using USDA open research data via CropScape (e.g., Cropland Data Layer) for crop classification in a given year, estimated yield, and the like.

Figure 3:
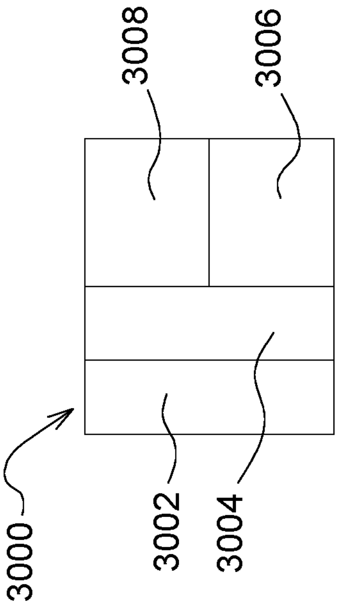
FIG. 3 is a block diagram of an exemplary first map representing a single field with four management zones.

In one example, referring to FIG. 3 and FIGS. **4*a*-4*d*, a mapped farm 3000 is represented as having four fields 3002, 3004, 3006, 3008. It should be noted that equivalent embodiments may represent a single field having four sub-fields, or management zones, without altering the scope of the following discussion or an invention as associated therewith. In accordance with step 210 of the above-referenced method 200**, a nitrogen application map may be selected. The present example may utilize fewer factors to determine nitrogen than would typically be used for real nitrogen fertilizer application planning, with the management level at the field level rather than subfield level, for illustrative purposes.

In accordance with step 220 of the above-referenced method 200, underlying information is gathered to initially generate the map, as depicted in Table 1 below:

TABLE 1

| a Field | b N rate (lbs/ac) | c Confidence | d Error Range (lbs/ac) | e Yield Goal (Bu/ac) | f N factor | g N credit (lbs/ac) | h Soil Test (lbs/ac) | i Crop Rotation |
|---|---|---|---|---|---|---|---|---|
| 3002 | 225 | High | 0 | 200 | 1.25 | 25 | 25 | Corn |
| 3004 | 210 | Medium | 20 | 200 | 1.25 | 40 | Unknown | Beans |
| 3006 | 250 | Medium | 0 | 200 | 1.25 | 0 | Unknown | Corn |
| 3008 | 250 | Low | 40 | 200 | 1.25 | 0 | Unknown | Unknown |

In this example, the underlying information is a corn crop yield goal (column e), a nitrogen factor for the crop (column f), and a nitrogen credit for the nitrogen already in the soil (column g). An exemplary, if not best, source of the nitrogen credit is from a soil nitrogen test (column h). If that data is not available, a less accurate estimate can be provided by knowing the crop for the previous year (column i). The prescribed nitrogen application rate (column b) is determined by the following formula:

$$\text{Prescribed } N = \text{Yield Goal} * N \text{ factor} - N \text{ credit}$$

In this example, the fields 3002, 3004, 3006, 3008 of farm 3000 are all to be planted to corn with a yield goal of 200 bu/ac (column e). The N factor for all fields 3002, 3004, 3006, 3008 is 1.25 lbs/bu (column f).

In an embodiment, the table may include or be part of a multidimensional data structure such that time series changes in the data may be better reflected and/or implemented. For example, some models may require multiple years of historical data, wherein a more comprehensive understanding of crop rotation may be most relevant, whereas in other embodiments the most recent prior crop may be sufficient.

In accordance with steps 230 and 240 of the above-referenced method 200, if soil test results are not available, the nitrogen credit may be estimated using substitute values from the following prioritized rule set. The resulting nitrogen prescription may also be assigned a confidence level and a +/− error range. Column c shows one of three confidence levels for the accuracy of the Prescribed N Rate of column b. Confidence of the accuracy may also be expressed as an error range as in column d or any other suitable manner.

```
IF soil test results are available THEN
    Use soil test results as nitrogen credit
    Error range is 0
    Confidence level is high
ELSEIF prior year's crop is known THEN
    IF prior crop is corn THEN nitrogen credit is 0 lbs/ac
        END
    IF prior crop is beans THEN nitrogen credit is 40 lbs/ac
        END
    Error range is 20 lbs/acre
    Confidence level is medium
ELSE
    Nitrogen credit is 0
    Error range is 40 lbs/ac
    Confidence level is low
END
```

In accordance with steps 250 and 260 of the above-referenced method 200, a map may be generated and displayed, for example in forms as illustrated in FIGS. 4*a*-4*d*.

Figure 4A:
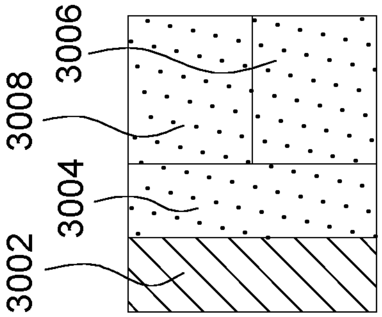
FIGS. 4*a*-4*d* are block diagrams representing different elements applied to the first map of FIG. 3.

In a particular example, as represented in FIG. 4*a*, field 3002 is filled in a first configuration (e.g., dashed) to represent no assumptions in the underlying data, since actual soil test results were used, and fields 3004, 3006, and 3008 are filled in a second configuration (e.g., dotted) to represent that assumed values were used for the nitrogen credit. Of course, the first and second configurations may take any of various alternative forms such as for example to represent values as colors, patterns, intensities, flashing and flashing rates, 2D contours, 3D contours, with augmented or virtual reality, or any of various other depictions within the scope of the present disclosure.

Figure 4B:
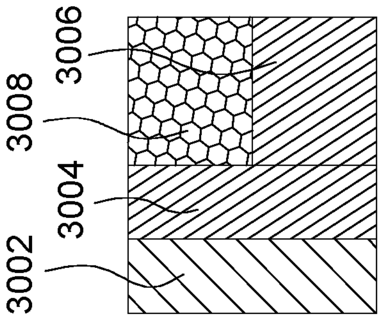

In another example, as represented in FIG. 4*b*, varying confidence levels are represented for the respective field prescription, with a first configuration in field 3002 to represent a "high" confidence level, a second configuration in fields 3004 and 3006 to represent a "medium" confidence level, and a third configuration in field 3008 to represent a "low" confidence level. It may be understood that the different shading configurations may be replaced with, for example, different coloring configurations or equivalents within the scope of the present disclosure.

Figure 4C:
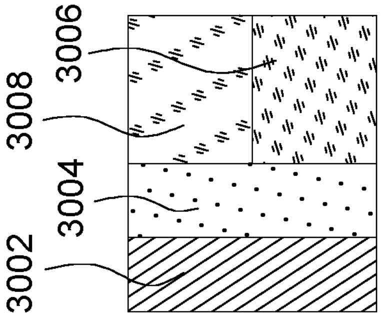

In another example, as represented in FIG. 4*c*, varying application rates and confidence levels are simultaneously represented. The first configuration in field 3002 may be keyed to represent application rates between 220 and 240 pounds per acre (lbs/ac), a second configuration as used in field 3004 is keyed to represent application rates below 220 lbs/ac, and third and fourth configurations as used in fields 3006 and 3008, respectively, are both keyed to represent application rates above 240 pounds per acre (lbs/ac). The first configuration is further associated with "high" confidence, whereas both of the second and third configurations may be associated with "medium" confidence, and the fourth configuration is associated with "low" confidence. As another example to further illustrate the same associations, the first configuration (for field 3002) may be fully shaded (to represent "high" confidence) and using the color orange (to also represent the medium application rates), whereas the second configuration (for field 3004) may be densely dotted (to represent "medium" confidence) using the color green (to also represent the lower application rates), the third configuration (for field 3006) may also be densely dotted (to represent the same "medium" confidence as the second configuration) and colored red (to represent the higher application rates), and the fourth configuration (for field 3008) may be sparsely dotted (to represent the "low" confidence) and colored red (to represent the same higher application rates as the third configuration).

In accordance with step 270 of the above-referenced method 200, a user may be presented with a display including Table 2, below, as an editable version of Table 1, the map as represented in FIG. 3 showing fields 3004, 3006, and 3008 with assumed values, and a prompt to replace at least some (e.g., estimated or assumed) data with improved (e.g., substitute) data such as a known crop or soil test result. For example, predetermined management rules may prohibit low confidence prescriptions from being used in the farm 3000 and that may be communicated with text as part of, or alongside, the prompt.

TABLE 2

| a Field | b N rate (lbs/ac) | c Confidence | d Error Range (lbs/ac) | e Yield Goal (Bu/ac) | f N factor | g N credit (lbs/ac) | h Soil Test (lbs/ac) | i Crop Rotation |
|---|---|---|---|---|---|---|---|---|
| 3002 | 225 | High | 0 | 200 | 1.25 | 25 | 25 | Corn |
| 3004 | 210 | Medium | 20 | 200 | 1.25 | 40 | Unknown | Beans |
| 3006 | 250 | Medium | 0 | 200 | 1.25 | 0 | Unknown | Corn |
| 3008 | 250 | Low | 40 | 200 | 1.25 | 0 | Unknown | Unknown |

In an embodiment, one or more aspects of the prompt and subsequent editing may be provided using a speech system or any other suitable user interface.

The prohibition for field 3008 may for example inhibit the operation of a fertilizer application from applying N fertilizer. This inhibition could be enforced by not allowing an applicator to receive the map or, if the map is downloaded the machine, by not allowing the data to control one or more fertilizer application actuators.

In accordance with step 280 of the above-referenced method 200, we may assume for illustrative purposes the user has received a soil test result for field 3008 of 50 lbs/ac which is then entered into the editable Table 2 in column h.

Figure 4D:
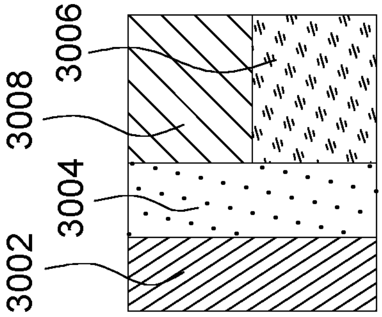

In accordance with step 290 of the above-referenced method 200, the prescription is accordingly recalculated, the map regenerated, and a new display is provided as represented in FIG. 4*d*. Since there are no "low" confidence prescriptions, the prohibition for field 3008 (as represented in Table 3) and any such corresponding messages in the display may now be removed.

TABLE 3

| a Field | b N rate (lbs/ac) | c Confidence | d Error Range (lbs/ac) | e Yield Goal (Bu/ac) | f N factor | g N credit (lbs/ac) | h Soil Test (lbs/ac) | i Crop Rotation |
|---|---|---|---|---|---|---|---|---|
| 3002 | 225 | High | 0 | 200 | 1.25 | 25 | 25 | Corn |
| 3004 | 210 | Medium | 20 | 200 | 1.25 | 40 | Unknown | Beans |
| 3006 | 250 | Medium | 0 | 200 | 1.25 | 0 | Unknown | Corn |
| 3008 | 250 | High | 40 | 200 | 1.25 | 0 | 50 | Unknown |

In an embodiment as briefly referenced above, the method 200 may be applied for seeding prescription map types. In such an example, seeding operation data may be available, wherein an end date of the operation is used in model inputs. In the absence of such data, the missing information can be supplied manually, for example in response to a user prompt, or alternatively using estimated information. One exemplary strategy for estimating information in this context may involve interpolation, wherein if no planting date for that crop was available for a field in a current year, but information is available for the same day of the past year, then such information may be used. An organization crop average may be used for interpolation, for example where a minimum of five data points are available, wherein the data for the current year may be applied. A georeferenced/geographic distance crop average may likewise or alternatively be used for interpolation, for example where a minimum of five different data points are available within X radius), wherein the data for the current year may be applied. Satellite inference may be used for interpolation, wherein for example crop knowledge and Normalized Difference Vegetation Index (NVDI) data may be used to narrow the estimate to within about five days. As an alternative to the interpolation examples, an automated strategy may be implemented which progressively goes through a prioritized list of estimation strategies until a suitable answer is found or otherwise defaults to the above-referenced manual user entry of the missing information.

One of skill in the art may appreciate that management zones as discussed below or otherwise within the scope of the present disclosure may be at any desired level ranging from per-plant to sub-field to field to farm, etc.

Figure 5:
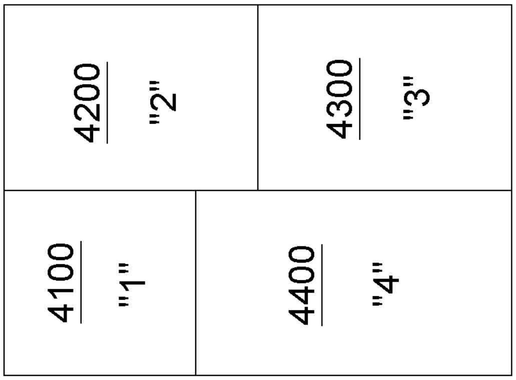
FIG. 5 is a block diagram of an exemplary second map representing a different field with four management zones.

Another illustrative example as described below will focus on a corn field with four management zones, and further relates to carbon footprint analysis in accordance with ISO (International Organization for Standardization) standard 14067. In the present example, with reference to FIG. 5, we assume a field 4000 having four management zones or regions 4100, 4200, 4300, 4400. The carbon footprint analysis may be performed for each management zone with respect to a plurality of constituent parameters including, for example and without limitation, drying, natural gas, electricity, propane, gasoline, insecticides, herbicides, residue nitrogen, lime, sulfur, potash, phosphate, manure nitrogen, and inorganic nitrogen.

In this example, the carbon footprint of the field 4000 is being calculated by management zone for submission to an organization for an Environmental Services Payment. A first requirement for submission is that inorganic nitrogen data must be from authenticated, site-specific machine records, at least because it is a primary source of carbon dioxide (CO2). A second requirement for submission is that residue nitrogen data must be from an authenticated yield monitor data from the previous cropping season, at least because it is the second highest source of CO2. A third requirement for submission is that other data must be authenticated by an authorized person and the source identified. A fourth requirement for submission is that if the confidence is less than "High", then a worst case value must be used in the carbon footprint calculation. A fifth requirement for submission is that the sources of other data must be documented.

For example, an authorized human must sign off on entered, or estimated, data for the respective data to be considered authentic. A sixth requirement for submission is that, to be acceptable, all data needs to be submitted with authentication by a person or an authenticated source. In this context, "estimated" data is not acceptable, and any one of the following would be necessary: an error or uncertainty of less than ten percent; confidence levels of "high" or OK; or an exemption on data quality.

In some examples, the data may be stored in an immutable ledger such as a blockchain. In some examples, the data may be in a table format. Any suitable storage format may be used.

Figure 6:
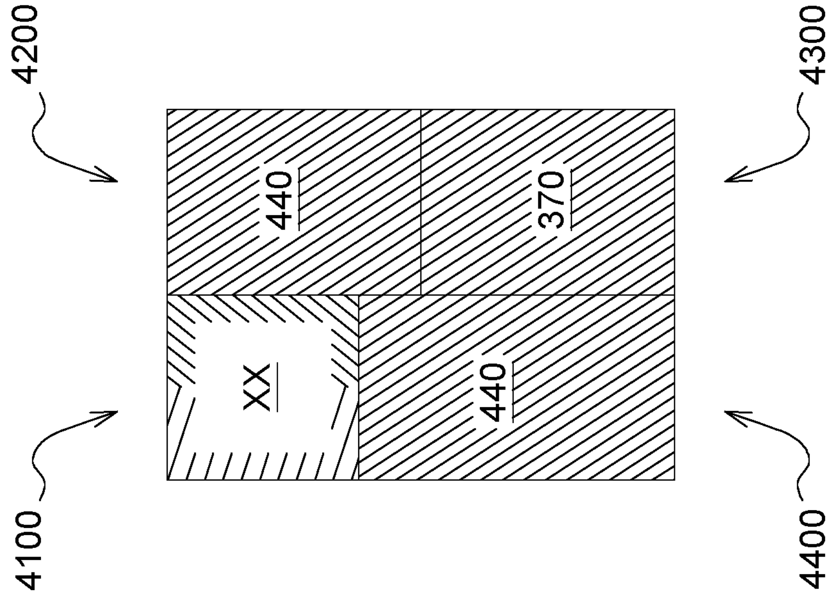
FIG. 6 is a block diagram representing different elements applied to the second map of FIG. 5.

In this example, with further reference to FIG. 6, management zones 4200, 4300, and 4400 each have fully supplied and documented data, depicted as a numeric value of gCO2e/kg grain harvested and with a particular hashed configuration in their background regions. Alternatively, management zone 4100 has missing data resulting from a planting operation being performed at a later time than the rest of the field due to a wet spot. Some data from the second field visit were not entered into the CO2 footprint database. Furthermore, in an estimate of CO2 emissions from diesel fuel, it was assumed that standard fuel was used. There is an opportunity to use a reduced CO2 value in the footprint calculation if documentation of a biodiesel fuel can be provided. The missing data is denoted by "XX" for the total CO2 value and a keyed background configuration on the left side of region 4100, whereas a different background configuration on the right side of region 4100 may indicate that additional non-required information could result in a lower CO2 footprint value.

The field 4000 may of course be visually represented in any of numerous alternative ways to indicate the same status as noted above. For example, the hashed configuration for management zones 4200, 4300, and 4400 could simply be replaced with a first color (e.g., green) background, whereas the background configuration for the left side of management zone 4100 may be replaced with a second color (e.g., red) and the background configuration for the right side of management zone 4100 may be replaced with a third color (e.g., blue) to indicate the same above-referenced conditions.

In this example, an authorized human can provide the missing data, for example via user interface 130. This can result in the "XX" being replaced by a calculated number. The background configuration for the left side of management zone 4100 may accordingly be replaced with a background configuration to match those of management zones 4200, 4300, and 4400. If the non-required information is supplied, then the calculated number may be adjusted downward and the background configuration for the right side of management zone 4100 may accordingly be replaced with a background configuration to match those of management zones 4200, 4300, and 4400. In some examples, this interaction is similar to what was shown in the nitrogen example above.

Besides hash patterns, colors, and numbers, exemplary visual elements may utilize alternative patterns, intensities, flashing, three dimensional (3D) perspectives on a flat screen, augmentations of field images, text, tables, or any other suitable representation. In some examples, the user interface may also include sounds to denote certain situations like invalid or missing data, speech output, or speech input.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

As used herein, the phrase "one or more of," when used with a list of items, means that different combinations of one or more of the items may be used and only one of each item in the list may be needed. For example, "one or more of" item A, item B, and item C may include, for example, without limitation, item A or item A and item B. This example also may include item A, item B, and item C, or item Band item C.

Thus, it is seen that the apparatus and methods of the present disclosure readily achieve the ends and advantages mentioned as well as those inherent therein. While certain preferred embodiments of the disclosure have been illustrated and described for present purposes, numerous changes in the arrangement and construction of parts and steps may be made by those skilled in the art, which changes are encompassed within the scope and spirit of the present disclosure as defined by the appended claims. Each disclosed feature or embodiment may be combined with any of the other disclosed features or embodiments.

What is claimed is:

1. A computer-implemented method of generating a map to be utilized by a work machine for control of one or more actuators during a work cycle, the method comprising:

teaching one or more learning models at least in part by developing, for each of various map iterations over time and for each respective map type of a plurality of map types, at least first data including estimated information for respective data entry fields, second data including at least one confidence check result for the respective map, and stored correlations there between, wherein the respective first data for each map iteration is correlated with a desired confidence check result for each of the respective data entry fields comprising estimated information or a failed confidence check for at least one of the respective data entry fields;

selectively retrieving a map type for the map to be generated, the map type associated with a plurality of data entry fields needed to populate the map;

populating a first set of the plurality of data entry fields for which underlying information is available from at least one data source, and identifying a second set of any data entry fields for which at least some underlying information is missing after the first set of data entry fields is populated;

automatically selecting estimated information to populate the second set of data entry fields, wherein the estimated information is extracted in part using at least one learning model corresponding to the selected map type and based on stored correlations between relevant data entry fields for the map type and a desired confidence check result;

generating the map including the underlying information and the estimated information in the corresponding data entry fields;

displaying the map on a user interface associated with a particular authorized user, wherein the displayed map includes an error estimate indication corresponding to at least one of the second set of data entry fields on at least a portion thereof;

automatically controlling at least one actuator for the work machine using one or more map outputs if a confidence check result associated with each error estimate indication satisfies specified and corresponding thresholds, or automatically inhibiting use of the map for automatic control during the work cycle if a confidence check result associated with at least one error estimate indication fails to satisfy the specified and corresponding thresholds;

generating a user prompt enabling user input via the user interface associated with the particular authorized user regarding missing information for which estimated information was previously selected, and/or information correcting one or more of the second set of data entry fields;

regenerating the map including user input provided for replacing at least part of the estimated information, and displaying the regenerated map including any revised error estimate indications after the user-provided information has been applied; and providing substitute information as feedback for further teaching of the respective model of the one or more models in view of a corresponding change in the confidence check result correlating to the relevant data entry fields for the respective map type, the substitute information comprising the user input.

2. The method of claim 1, wherein the error estimate indication comprises at least one of: a location on the map where estimated information was used to populate a corresponding data entry field; an estimated error determined from using the estimated information; a number of parameters that were estimated to generate a map value for at least one of the data entry fields; and a data authenticity value.

3. The method of claim 1, further comprising writing one or more of an initial map, the regenerated map, and the user-provided information to a computer-based immutable ledger.

4. The method of claim 3, wherein at least part of the user-provided information is read accessible in association with the at least one data source for subsequent map generation.

5. The method of claim 1, further comprising writing an inhibition status for the map to a computer-based immutable ledger.

6. The method of claim 1, wherein the at least one data source having available underlying information comprises data storage including georeferenced data from historical operations for a location corresponding to the map being generated.

7. A system for generating a map to be utilized by a work machine for control of one or more actuators during a work cycle, the system comprising:

data storage having stored thereon one or more map types, each map type associated with a plurality of data entry fields needed to populate the map;

at least a first user interface associated with a particular authorized user and comprising a display unit;

at least one processor functionally linked to the data storage and to the user interface, and configured to:

teach one or more learning models at least in part by developing and storing in the data storage, for each of various map iterations over time and for each respective map type of the one or more map types, at least first data including estimated information for respective data entry fields, second data including at least one confidence check result for the respective map, and correlations there between, wherein the respective first data for each map iteration is correlated with a desired confidence check result for each of the respective data entry fields comprising estimated information or a failed confidence check for at least one of the respective data entry fields;

selectively retrieve a map type for a map to be newly generated;

for the retrieved map type, populate a first set of the respective plurality of data entry fields for which underlying information is available from at least one data source, and identify a second set of any data entry fields for which at least some underlying information is missing after the first set of data entry fields is populated;

automatically select estimated information to populate the second set of data entry fields, wherein the estimated information is extracted in part using at least one learning model corresponding to the selected map type and based on stored correlations between relevant data entry fields for the map type and a desired confidence check result;

generate the map including the underlying information and the estimated information in the corresponding data entry fields;

display the map on the display unit, wherein the displayed map includes an error estimate indication corresponding to at least one of the second set of data entry fields on at least a portion thereof;

automatically control at least one actuator for the work machine using one or more map outputs if a confidence check result associated with each error estimate indication satisfies specified and corresponding thresholds, or automatically inhibit use of the map for automatic control during the work cycle if a confidence check result associated with at least one error estimate indication fails to satisfy the specified and corresponding thresholds;

generate a user prompt enabling user input via the user interface regarding missing information for which estimated information was previously selected, and/or information correcting one or more of the second set of data entry fields;

regenerate the map including user input provided for replacing at least part of the estimated information, and display the regenerated map including any revised error estimate indications after the user-provided information has been applied; and provide substitute information as feedback for further teaching of the respective model of the one or more models in view of a corresponding change in the confidence check result correlating to the relevant data entry fields for the respective map type, the substitute information comprising the user input.

8. The system of claim 7, wherein the error estimate indication comprises at least one of: a location on the map where estimated information was used to populate a corresponding data entry field; an estimated error determined from using the estimated information; a number of parameters that were estimated to generate a map value for at least one of the data entry fields; and a data authenticity value.

9. The system of claim 7, wherein the at least one data source comprises the at least first user interface.

10. The system of claim 7, wherein the at least one processor is further configured to write one or more of an initial map, the regenerated map, and the user-provided information to a computer-based immutable ledger.

11. The system of claim 7, wherein at least the first user interface resides in the work machine.

12. The system of claim 7, wherein the at least one data source having available underlying information comprises the data storage further having stored thereon georeferenced data from historical operations for a location corresponding to the map being generated.

* * * * *